Oct. 23, 1923.

W. W. CHAMBERLAIN 1,471,544

NONSKIDDING DEVICE

Filed Nov. 8, 1922

Inventor
WALTER W. CHAMBERLAIN
By Harry D. Wallace
Attorney

Patented Oct. 23, 1923.

1,471,544

UNITED STATES PATENT OFFICE.

WALTER W. CHAMBERLAIN, OF WATERTOWN, NEW YORK.

NONSKIDDING DEVICE.

Application filed November 8, 1922. Serial No. 599,694.

*To all whom it may concern:*

Be it known that I, WALTER W. CHAMBERLAIN, a citizen of the United States, residing at Watertown, in the county of Jefferson and State of New York, have invented certain new and useful Improvements in Nonskidding Devices, of which the following is a specification.

This invention relates to improvements in non-skidding devices for vehicle wheels, and has for its object to provide a novel, simple and effective device of the class, which may be detachably applied to the vehicle wheel, the arrangement of the device being such that it is self-retaining when once installed. A further object is to provide a non-skidding device having a saddle-like body which overlies and grips the felly of the wheel between adjacent spokes, and wherein the skirts of the saddle are provided with means for detachably securing two or more chains which embrace the tread and sides of the tire shoe.

This invention relates particularly to improvements in the devices shown and described in my pending application Serial No. 591,906, filed October 2, 1922.

The various features and parts of the invention will be understood from the detailed description which follows, and by reference to the accompanying drawing, in which—

Figure 1:
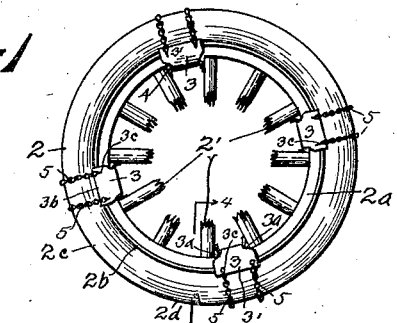
Figure 2:
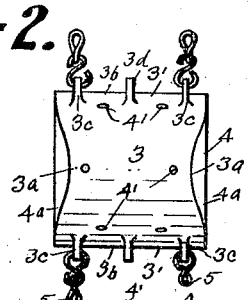
Figure 3:
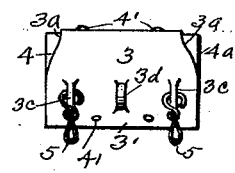
Figure 4:
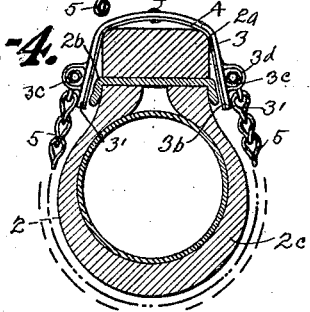
Figure 5:
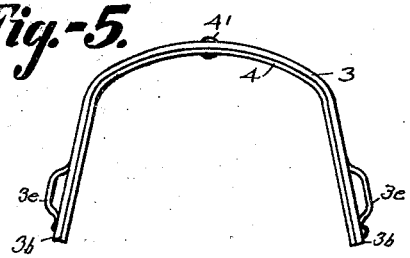
Figure 6:
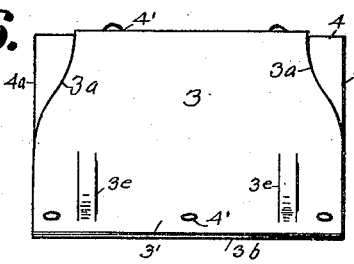
Figure 7:
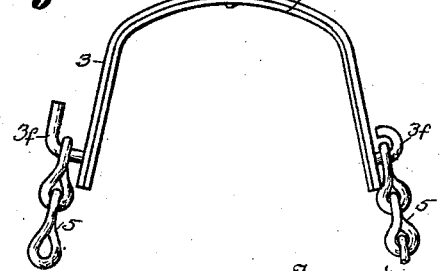
Figure 8:
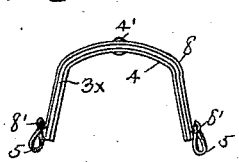

Figure 1 is a broken side view of an automobile wheel, to which a number of my nonskidding devices are applied. Fig. 2 is an enlarged top-plan view of the saddle; showing the disposition and arrangement of the integral lugs for attaching the chains. Fig. 3 is a side elevation of the same. Fig. 4 is a vertical cross-section; taken on line 4—4 of Fig. 1. Fig. 5 is an end view; showing a modification of the chain-attaching lugs. Fig. 6 is a side elevation of the same. Fig. 7 is a view showing hooks for securing the ends of the chains. And Fig. 8 is a view showing a series of straps carried by the saddle and having terminal hooks for supporting the chains.

In the drawing, 2 represents an automobile wheel including the spokes 2', the felly 2$^a$, the demountable rim 2$^b$, and 2$^c$ is the well-known rubber-fabric shoe of a pneumatic tire, the peripheral margin of the shoe constituting the tread 2$^d$ of the tire.

My improved non-skidding device consists of a U-shaped body 3, which is mounted saddle-like upon the inner face of the felly 2$^a$, the skirts 3' of the saddle 3 extending past the opposite sides of the felly and overlapping the rim 2$^b$. The saddle 3 is preferably substantially the length of the space between the adjacent spokes 2', and the ends of the crown portion of the body 3 are preferably cut away, as at 3$^a$, to loosely receive the spokes 2', as best seen in Fig. 1. The hollow side of the saddle is preferably lined with sheet rubber, or like cushion material 4, to prevent the metal body from chafing or marring the felly, as well as to increase the adhesion of the parts, and the pad 4 is made rigid to the saddle by rivets 4'. The ends 4$^a$ of the pad are cut square instead of being notched like the saddle (see Figs. 2 and 6), and the said ends alone contact with the spokes 2'. Near the opposite longitudinal margins 3$^b$, the saddle 3 is provided with a number of alining laterally projecting lugs or loops, 3$^c$ and 3$^d$, all of which are perforated for facilitating the attaching of the non-skidding chains 5, which may be directly attached to the lugs, as shown in Figs. 1, 2, and 3, by means of terminal hooks, or the end links of the chain may be connected directly to the lugs or loops, as shown in Figs. 7 and 8. In practice, two, three or four of the devices are usually applied to each of the rear, or driven wheels of an automobile, as shown in Fig. 1. The saddle 3 is preferably made of malleable metal, so that it may be readily bent to substantially conform to and fit the felly and rim, as shown in Fig. 4, and when so fitted, and the chains 5 are applied, there is no likelihood or danger of the device becoming distorted or accidentally released. When the chains 5 engage the road-way, the strain or pull upon the arms of the saddle is equally distributed, so that there is no danger of the saddle being shifted laterally. When the wheel rotates, and the non-skidding devices are carried towards the top of the wheel, the saddle cannot gravitate away from the felly, because the free ends of the pad 4 being in constant engagement with the converging spokes, tend to hold the saddle in the normal position.

In Figs. 5 and 6 the saddle is shown operated upon by suitable dies for slitting the skirts 3' and for expanding therefrom integral chain supporting lugs, as 3$^e$. And Fig. 7 shows simple hooks 3$^f$, for the purpose.

In Fig. 8, the saddle 3$^x$ is preferably plain, and instead of the integral lugs shown in the other views, the chains are detachably supported by similar spaced transversely arranged straps 8, which conform substantially to the saddle, and are held in place by certain of the rivets that secure the pad 4. The opposite ends of the straps 8 are formed into hooks 8', to which the end links of the chains 5 may be secured.

Having thus described my invention, what I claim, is—

1. In a non-skidding device, a U-shaped metal body adapted to be mounted saddle-like upon the felly of a wheel between adjacent spokes, the opposite edges of the curved portion of the metal body being cut out opposite the adjacent spokes so as to be spaced therefrom, and a lining for the body having flexible edge portions extending across the marginal cut-outs of the body for substantially filling the space between the edges of the curved portion of the body and the spokes to protect the latter from being engaged by the metal body.

2. A non-skid device comprising a saddle adapted to embrace the felly of a wheel between adjacent spokes, and a lining for the saddle flexibly projecting beyond the opposite ends thereof and unsupported thereby adjacent the spokes for flexible engagement with spokes of the wheel.

In testimony whereof I affix my signature.

WALTER W. CHAMBERLAIN.